No Printed Specification Available
7413X
J. Riley,
Hose Coupling,
Patented Feb. 6, 1833.
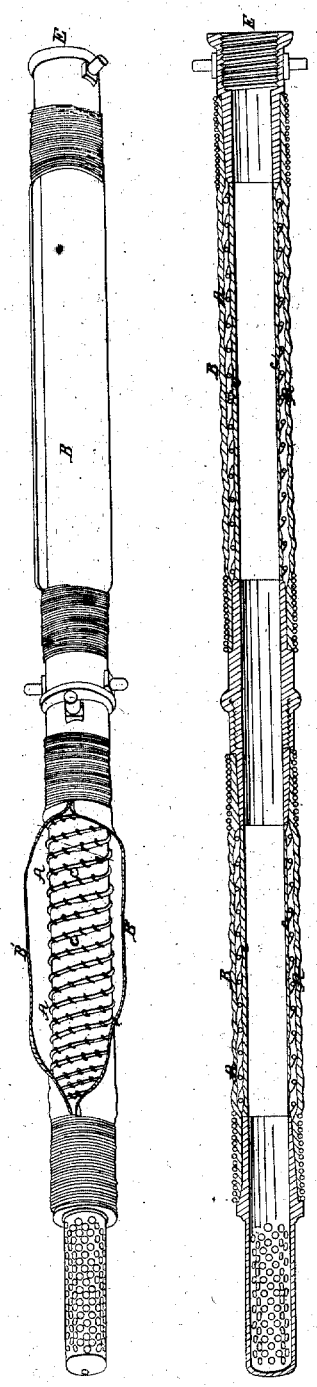
N. PETERS, PHOTO-LITHOGRAPHER, WASHINGTON, D. C.

James Riley.
Letters Patent.

The Schedule referred to in these Letters Patent, and
making part of the same, containing a description in the words
of the said James Riley himself of his Improvement in the Manu
=facture of Suction Hose for Fire Engines &c.

Before describing my Improved Suction Hose, I will describe the
Suction Hose now in general use, so that the difference between the
two, and the advantages of my improvement may be more apparent.
The suction Hose now in use is made in the following manner, viz.
Copper rings of two inches in diameter, or thereabouts, are slipped
upon a pole of the same diameter, as near to each other as possible
and covered with leather. Then, sometimes, a composition of Tar &c
is put over the leather, and the whole is inclosed in an additional
covering of leather. The pole is then drawn out, and the Hose is made.
Suction Hose for the equipment of one Fire Engine is usually made of
four pieces, seven feet each in length, two of which pieces (when the
Hose is not in use) are run upon poles, and are suspended upon
each side of the Engine. This Hose, as is manifest from the above descrip-
tion, is <u>inelastic</u>. The improved Suction Hose which I have inven
ted, and for which I hereby claim a Patent, is thus made; viz.
A pole of the size of Suction Hose wanted, is first covered with leather.
The pole is then taken out, and a size of wire corresponding to the
diameter of the screw intended to be attached to the suction hose, is
wound on to this pole. After winding on sufficient wire to cover
the leather, (this spiral wire is slipped off of the pole, is drawn over
the leather,) and stitched down to the leather, by a whip stitch from
end to end. Then a composition made of India Rubber dissolved
in alcohol, is put on, from end to end, to cover the whole of the spiral
wire. The leather thus covered with spiral wire and composition,
is

1413X is then inclosed in a covering of leather, which completes the Hose. This Hose can be made of any length required.

The great advantages, which my improved Suction Hose possesses over the hose now in use, are, 1st That it is Elastic, and is capable of being easily wound up upon a reel; whereas the common Suction Hose is Inelastic, cannot be wound up, and must be made in short pieces, of about seven feet each in length which pieces must be screwed together before commencing operations. This operation of screwing together at a fire, in cold weather, often occupies a half an hour which is a great loss of time. 2d The suction Hose now in use, divided into pieces as above mentioned, must be slipped upon poles suspended on each side of the fire engine, which are awkward and inconvenient appendages to the engines or must (when not in actual use) be otherwise disposed of in some manner equally as inconvenient. Whereas my improved Suction Hose can always remain screwed at one of its extremities to the aperture leading into the interior of the engine, and the Hose be twisted around some convenient part of the engine, thus being at all times ready for instantaneous action, by dropping it into the reservoir, without losing any time in screwing it together, it being in one piece. In cold, freezing weather, this is a very important advantage.

3d. Owing to the Suction Hose now in use being necessarily made in such short pieces, not more than two fire engines can conveniently be stationed at one Reservoir of water, for suction, at one time. I mean such reservoirs as are constructed under ground, in Boston, in the different streets, containing large quantities of water to be used in the extinguishing of fires. As my Improved Suction Hose can be made of any required length so that any number of engines may be drawing water simultaneously from the same reservoir; the great length of the suction hose admitting them to stand at various distances from the reservoir — without interfering with each other. To conclude, I claim as

1413X as my invention, the above described Improvement in the leather Hose now in use, whereby such hose is rendered Elastic;- may always remain screwed to the fire engine by one of its extremities, and conveniently wound about some part of the engine when not in use;- and that it may be made of any length which supersedes the necessity of screwing together, allows it to be p[illegible] into operation instantaneously and permits any number of Engines to be drawing water simultaneously from the same reservoir.

Jas. Riley

Exd W.C.

Witnesses
Jno. W. Davis
Patrick Riley (Dr in portfolio)

840 words]

(Patented (February 6. 1839)